(12) United States Patent
Lockyer et al.

(10) Patent No.: US 10,313,181 B2
(45) Date of Patent: Jun. 4, 2019

(54) NETWORK DIAGNOSTIC DEVICE

(71) Applicant: BRITISH TELECOMMUNICATIONS PUBLIC LIMITED COMPANY, London (GB)

(72) Inventors: Gary Lockyer, London (GB); Franco Badini, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 93 days.

(21) Appl. No.: 15/322,774

(22) PCT Filed: Jun. 18, 2015

(86) PCT No.: PCT/GB2015/051782
§ 371 (c)(1),
(2) Date: Dec. 29, 2016

(87) PCT Pub. No.: WO2016/001625
PCT Pub. Date: Jan. 7, 2016

(65) Prior Publication Data
US 2017/0155547 A1 Jun. 1, 2017

(30) Foreign Application Priority Data

Jun. 30, 2014 (GB) .................. 1411620.6

(51) Int. Cl.
*H04L 12/28* (2006.01)
*H04L 12/24* (2006.01)
*H04L 12/26* (2006.01)

(52) U.S. Cl.
CPC .......... *H04L 41/0677* (2013.01); *H04L 41/04* (2013.01); *H04L 41/069* (2013.01); *H04L 41/18* (2013.01); *H04L 43/0817* (2013.01)

(58) Field of Classification Search
None
See application file for complete search history.

(56) References Cited

U.S. PATENT DOCUMENTS 6,091,714 A * 7/2000 Sensel ................. H04L 12/1813
370/260
8,213,926 B2 * 7/2012 Ahmad ................. H04W 24/08
455/423

(Continued)

FOREIGN PATENT DOCUMENTS

| EP | 1 641 184 B1 | 11/2010 |
| EP | 2 592 782 | 5/2013 |
| GB | 2478978 A | 9/2011 |

OTHER PUBLICATIONS

International Search Report for PCT/GB2015/051782 dated Aug. 27, 2015, 3 pages.

(Continued)

*Primary Examiner* — Farah Faroul
(74) *Attorney, Agent, or Firm* — Nixon & Vanderhye PC (57) ABSTRACT

A diagnostic device for a communications network; the network comprising a customer communications network located at a customer location and connected by a customer communications link to a communications service provider network remote from the customer location. The device comprises a network monitoring interface arranged to monitor operation of the customer communications network; a processor arranged to detect faults in the operation of the customer communications network, a store for storing records of detected faults; a processor arranged to store records of detected faults in the store and to generate a report on a detected fault based on the stored records. The device is co-located with the customer communications network and further comprises: a first communications interface arranged to send to the communications service provider (Continued)

network via the customer communications link, the report generated on the detected fault; and a second communications interface arranged to send to the communications service provider network via a second communications link, the report generated on the detected fault.

16 Claims, 5 Drawing Sheets

(56) References Cited

U.S. PATENT DOCUMENTS

| | | | | |
|---|---|---|---|---|
| 8,417,114 B1* | 4/2013 | Storey | ............... | H04B 10/0773 398/16 |
| 8,619,589 B2* | 12/2013 | Bugenhagen | ....... | H04L 43/0876 370/235 |
| 2005/0101268 A1* | 5/2005 | Radosta | ............... | G06Q 10/08 455/115.1 |
| 2007/0005201 A1* | 1/2007 | Chenn | .................. | G07C 5/008 701/31.5 |
| 2008/0232259 A1 | 9/2008 | Thomson | | |
| 2009/0274104 A1 | 11/2009 | Addy | | |
| 2009/0276115 A1* | 11/2009 | Chen | ...................... | G07C 5/008 701/29.6 |
| 2010/0262467 A1 | 10/2010 | Barnhill et al. | | |
| 2011/0032816 A1 | 2/2011 | Isaksson et al. | | |
| 2012/0307983 A1* | 12/2012 | Faulkner | ................ | H04L 43/50 379/29.03 |
| 2012/0320789 A1 | 12/2012 | Wu et al. | | |
| 2014/0130111 A1* | 5/2014 | Nulty | .................. | H04N 17/004 725/107 |
| 2016/0065736 A1* | 3/2016 | Pedersen | ................ | H04M 3/51 379/266.07 |

OTHER PUBLICATIONS

International Preliminary Report on Patentability dated Jan. 3, 2017 issued in PCT/GB2015/051782 (8 pgs.).

International Search Report dated Aug. 27, 2015 issued in PCT/GB2015/051782 (10 pgs.).

GB Intellectual Property Office Search Report dated Dec. 17, 2014 (4 pgs.).

* cited by examiner

NETWORK DIAGNOSTIC DEVICE

This application is the U.S. national phase of International Application No. PCT/GB2015/051782 filed Jun. 18, 2015 which designated the U.S. and claims priority to GB Patent Application No. 1411620.6 filed Jun. 30, 2014, the entire contents of each of which are hereby incorporated by reference.

INTRODUCTION

The invention relates to communications networks in general and to a device and method for monitoring operation and reporting faults in a communications network.

There is a high cost to communications service providers in sending maintenance staff to customer premises to investigate suspected faults in the customer communications network or in the network connection. Modern customer communications network may have basic fault-reporting capability but it is often the case that a fault will result in malfunction of the customer communications network or the network connection preventing the customer communications network from reporting the nature of the fault to the service provider. This can result in unnecessary maintenance visits. Maintenance staff tend to be specialised in either customer communications network or link (i.e. network connection) faults and, where the nature of a fault is not known, it may be necessary to dispatch both a customer communications network specialist and a link specialist.

There is therefore a need for a device for installation at the customer premises or location that can monitor operation of the communications equipment, identify faults located at or visible from the customer premises or location and communicate details to the service provider, even when the network connection or the customer communications network being monitored has stopped working.

SUMMARY OF THE INVENTION

The present invention accordingly provides, in a first aspect, a diagnostic device for a communications network; in which the communications network comprises a customer communications network located at a customer location and connected by a customer communications link to a communications service provider network remote from the customer location. The diagnostic device comprises a network monitoring interface arranged to monitor operation of the customer communications network; a processor arranged to detect faults in the operation of the customer communications network, a store for storing records of detected faults; a processor arranged to store records of detected faults in the store and to generate a report on a detected fault based on the stored records. The diagnostic device is arranged to be co-located with the customer communications network and further comprises: a first communications interface arranged to send to the communications service provider network via the customer communications link, the report generated on the detected fault; and a second communications interface arranged to send to the communications service provider network via a second communications link other than the customer communications link, the report generated on the detected fault.

The present invention accordingly provides, in a second aspect, a method for diagnosing a fault in a communications network; in which the communications network comprises a customer communications network located at a customer location and connected by a customer communications link to a communications service provider network remote from the customer location; in which the method comprises, at a diagnostic device co-located with the customer communications network:

monitoring the customer communications network; detecting faults in the operation of the customer communications network; and generating fault reports comprising information on detected faults;

sending the fault reports to the communications service provider network via one of the customer communications link and a second communications link other than the customer communications link.

The present invention accordingly provides, in a third aspect, a computer program element comprising computer program code to, when loaded into a computer system and executed thereon, cause the computer system to perform the steps of the method set out above.

According to various embodiments, the device may further comprise:

a link monitoring interface arranged to monitor operation of the customer communications link; and a processor arranged to detect faults in the customer communications link (it is noted that the device set out above already comprises a processor arranged to store records of such detected faults in the store and to generate a report on a detected such fault based on the stored records).

a processor arranged to detect faults in a router comprised in the customer communications network.

a processor arranged to detect faults in a modem comprised in the customer communications network.

According to further embodiments:

each of the first and second communications interfaces are arranged to send to a service management server in the communications service provider network, fault report information based on the records stored in the store.

at least one of the first and the second communications interfaces are arranged to send to the communications service provider network a prompt to initiate testing from the communications service provider network of at least one of the customer communications network and the customer communications link.

the diagnostic device is arranged to be collocated with the customer communications network at a customer premises.

the second communications interface comprises a Wi-Fi interface.

the second communications interface comprises a cellular communications interface;

the fault report information identifies a location within the customer communications network associated with a detected fault.

the fault report information identifies whether a detected fault lies in the customer communications link or in the customer communications network.

the fault report information comprises information relating to a cause of a detected fault.

BRIEF DESCRIPTION OF THE DRAWINGS

Embodiments of the invention will now be described by way of example with reference to the drawings in which.

DETAILED DESCRIPTION

A hardware diagnostic device is described for installation at a customer location to monitor and report fault conditions in a communications network. The communications network comprises a customer communications network, a communications service provider network and customer communications link connecting the two. Here, a customer is a person to whom a communications service provider provides a communications service via a customer communications link between a customer communications network and a communications service provider network. The communications service provider network is located remote from the customer location and will typically comprise a wide area network, such as a regional or national telecommunications network. The customer communications network is located at a one or more customer premises or other location used by the customer. For example, the customer communications network could comprise a display panel for indicating bus times that is co-located at a bus stop with a router or modem for connecting to a communications service provider network. Alternatively, customer communications network could comprise a local area network (LAN) connecting a plurality of personal computers and printers via a switch to a router for connecting to a communications service provider network. For simplicity, we here use the word "location" to indicate premises, such as buildings, campuses and any kind of site but also locations such as street furniture at which customer equipment linked to a communications service provider network is located.

The diagnostic device is installed at the customer location so that it can monitor operation of communications equipment making up the customer communications network (although its use is not limited to communications equipment but extends to any equipment that it can monitor, for example, via internet protocol (IP) or via a standard communication protocol with reporting capability over IP or direct connection over RS232, Serial or USB. Where equipment is unresponsive, it is assumed to have failed. The diagnostic device identifies faults located at or visible from the customer location and communicates information on detected faults to the service provider, even when the customer communications link to the service provider or the components making up the customer communications network has stopped working. This is achieved by the ability of the diagnostic device to operate independently of the customer communications network and to communicate with the communications service provider network by at least two separate links. The service provider is thereby able to take informed decisions on how best to deal with faults that lie not in the service provider's network but in the network of their customer.

According to one embodiment, the diagnostic device also monitors, from the customer location end, operation of the customer communications link, identifies faults associated with the link and communicates information on detected link faults to the service provider. Advantageously, the diagnostic device is able to communicate with the communications service provider network by an alternative link. The service provider is thereby able to take informed decisions on how best to deal with faults that lie in the link between the service provider's network and the network of the customer. Basically, the diagnostic device checks whether a connection exists over the link to an (arbitrary) remote service such as a webserver on the wider Internet. If such a connection is detected, then the customer communications link being monitored (the normal network connection) is deemed to be functional. If the connection is not detected, then a connection may be attempted to a second, separate (arbitrary) remote service such as a webserver on the wider Internet. If this second connection is also not detected then the link being monitored is deemed to have failed.

Figure 1:
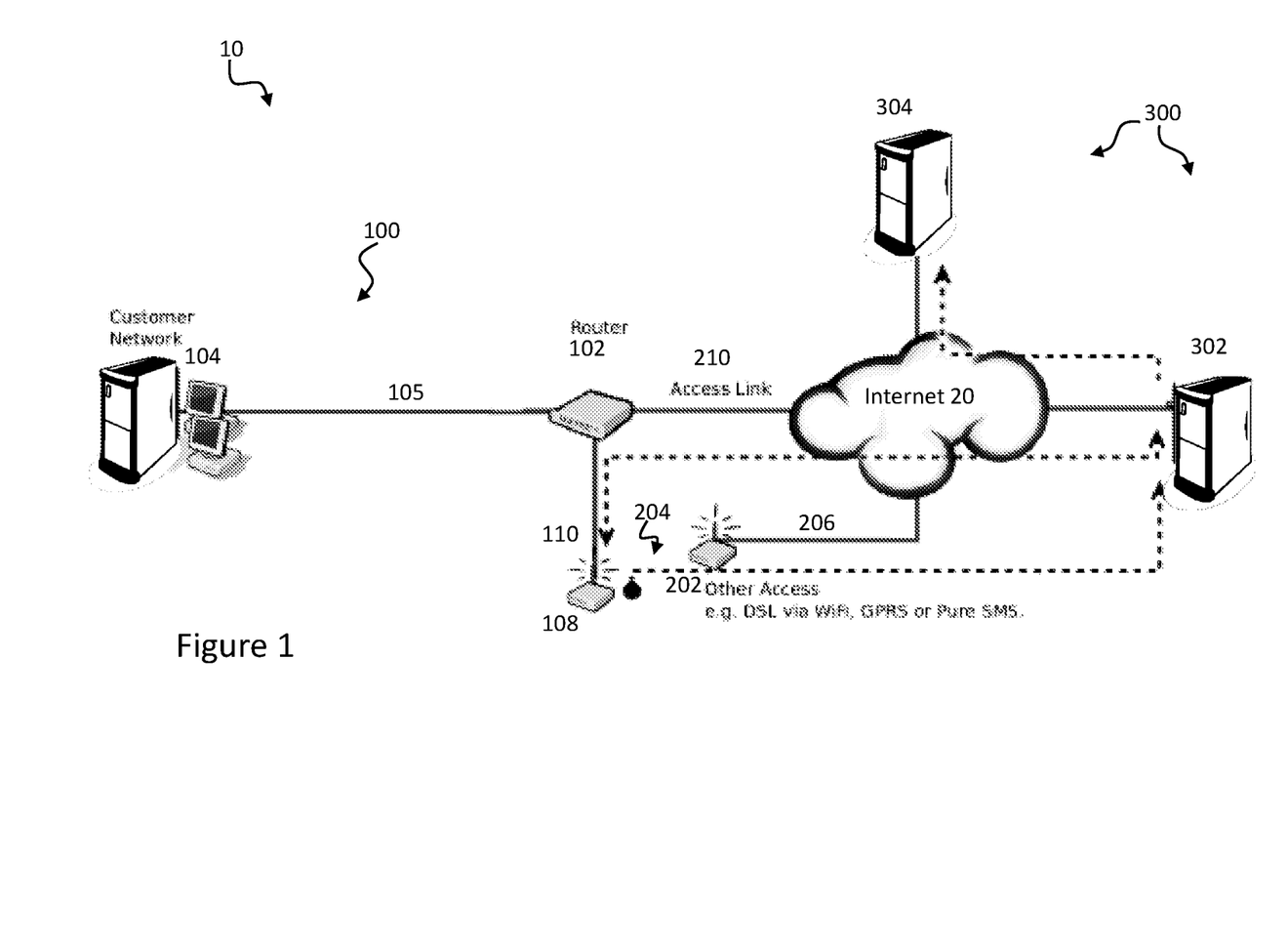
FIGS. 1, 2 and 3 show schematic representations of a communications network according to embodiments of the present invention.
Figure 2:
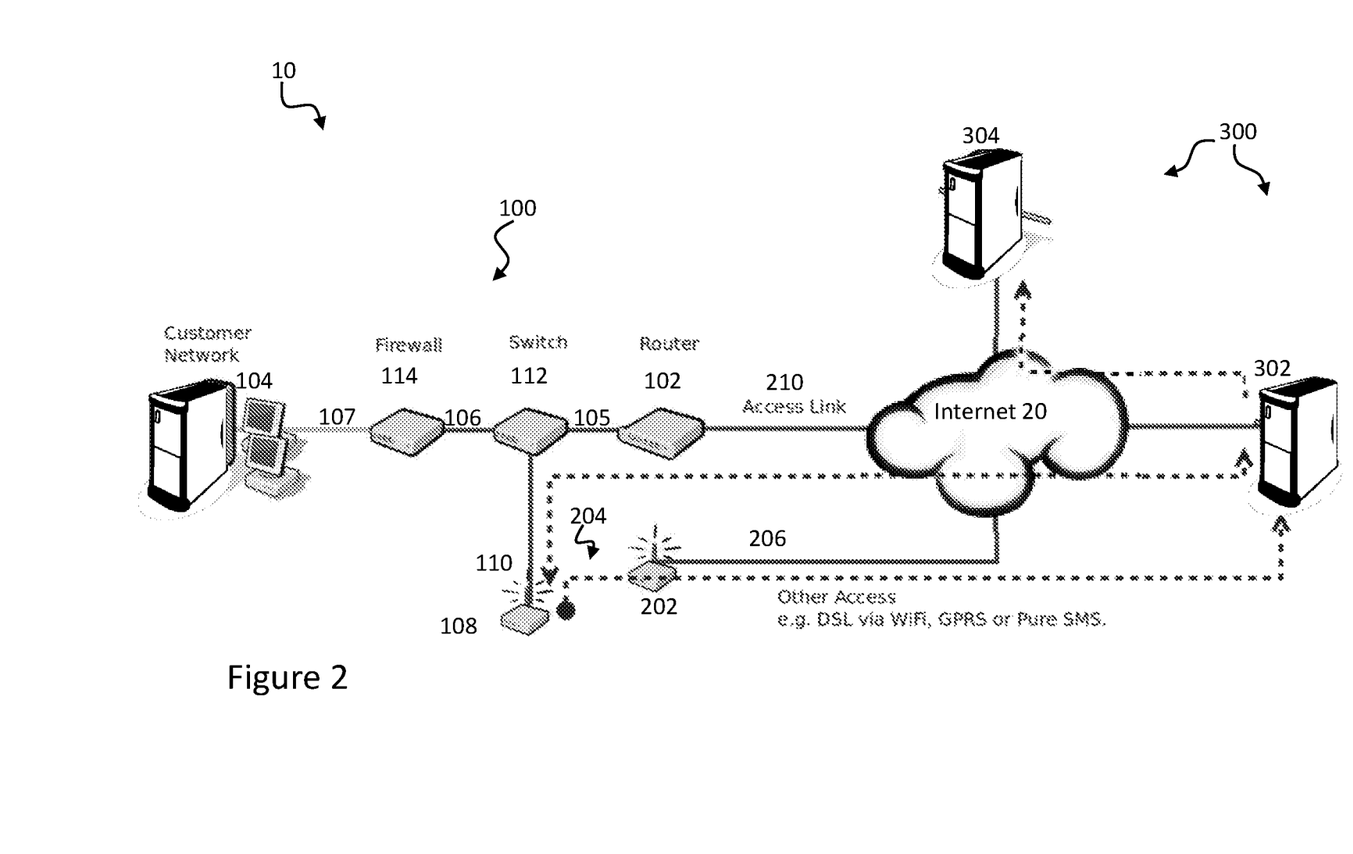
Figure 3:
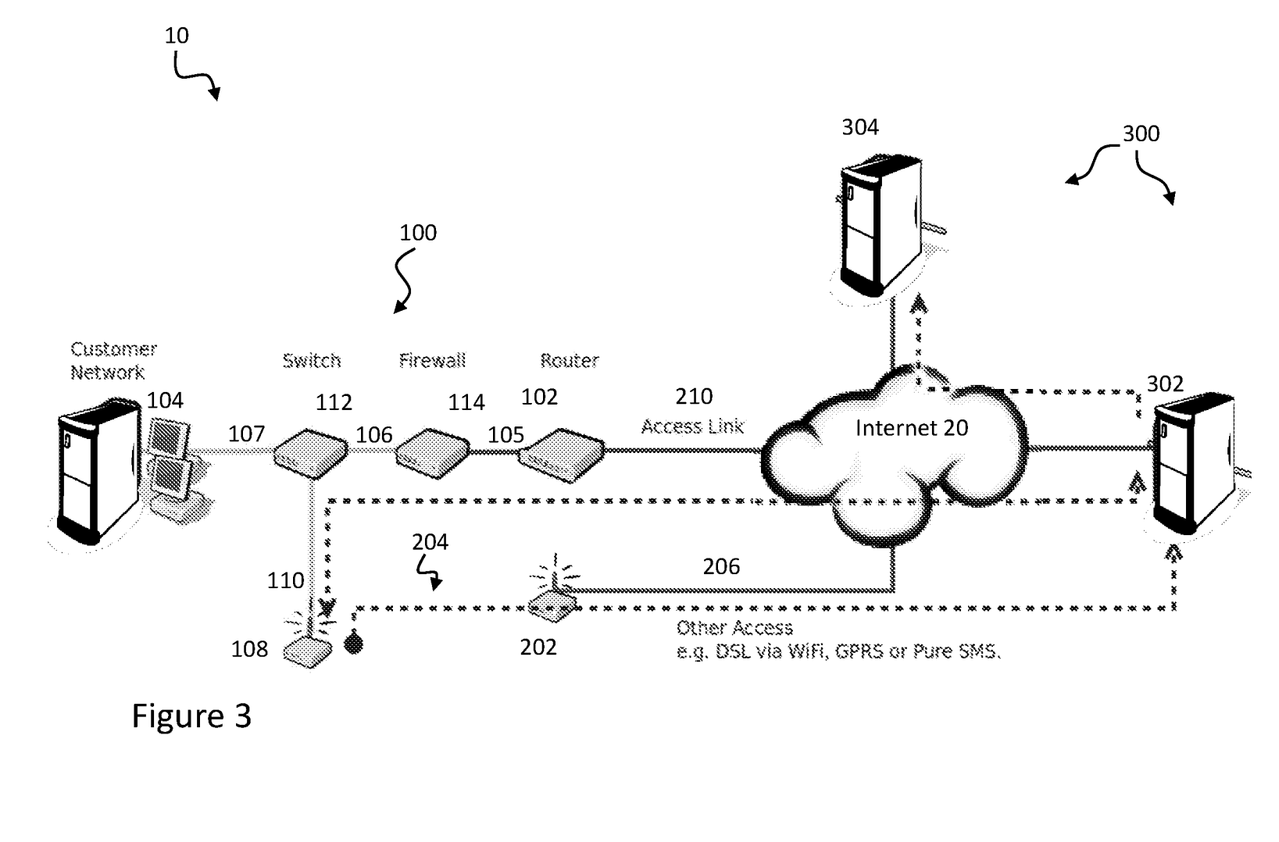

FIGS. 1, 2 and 3 show embodiments of the invention. In FIGS. 1, 2 and 3, physical connections are indicated by solid lines, whereas logical connections or signal flows are indicated by dotted lines. Communications network 10 suitable for implementing the invention comprises customer communications network 100, Communications service provider network 300 and Internet 20. The term "Internet" is used throughout to indicate any globally routable TCP/IP network such as the Internet or alternatively a privately addressed WAN or point to point link.

Turning to FIG. 1, customer communications network 100 is made up of router 102, customer LAN 104 (i.e. one or more interconnected servers and terminals) and connections 105 there-between. Router 102 acts as an interface between customer communications network 100 and Internet 20. Collocated with customer communications network 100 is diagnostic device 108, which is connected to router 102 by connection 110. Diagnostic device 108 and customer LAN 104 are connected to internet 20 via Router 102. Diagnostic device 108 is in communication with router 102 and also, via a wireless connection 204, with other communications device 202. Communication with other communications device 202 may not be permanent and may be established when a fault has been identified by diagnostic device 108.

Internet 20 is connected to customer communications network 100 and communications service provider network 300. Communications service provider network 300 comprises middleware 302 and fault management system 304. Other communications device 202 is connected to internet 20 via a connection 206 that does not pass through router 102.

Many features of FIG. 1 are common to FIGS. 2 and 3 and bear the same reference numerals throughout, for example, Internet 20 remains connected to customer communications network 100 and communications service provider network 300. Diagnostic device 108 is in communication, either permanently or otherwise, with other communications device 202. However, in FIGS. 2 and 3, customer communications network 100 is now made up of switch 112 and firewall 114, in addition to router 102, customer LAN 104 and connections 105, 106 and 107 there-between. Firewall 114, which separates and protects the internal customer network or LAN 104 from the Internet 20, may be located as in FIG. 2, between switch 112 and customer LAN 104, or as in FIG. 3, Firewall 114 may be located between switch 112 and router 102.

As shown in FIG. 1, the device 108 will normally be connected by a monitoring link 110, e.g. using Ethernet over copper or via a wireless link, e.g. using WiFi, to a router 102 internal to the customer location 100. Alternatively or in addition, as shown in FIGS. 2 and 3, device 108 may be connected by monitoring link 110 to a switch 112 that connects the router 102 with the internal customer network or LAN 104. Connection to the router can provide more comprehensive information on faults. In the embodiments of FIGS. 2 and 3, instead of being connected directly to router 102, diagnostic device 108 is now connected directly to switch 112.

Assuming both the necessary customer communications network components and the customer's normal network connection 210 are functioning, device 108 is able to report faults via the customer's normal network connection 210. That is, as well as using monitoring link 110 for monitoring operation of customer network 100, device 108 is able to use monitoring link 110 to send fault reports to customer communications network 100 for sending towards Internet 20. As shown in FIGS. 1, 2 and 3, the device may also be connected to Internet 20 via an alternative connection 204, 206, e.g. (i) via Wi-Fi to a network-connected device 202 external to the customer communications network or (ii) via a mobile telephone network (e.g. using SMS) external to the customer communications network. Device 108 is able to use alternative connection 204, 206 to send fault reports towards the Internet 20, for example when the necessary customer communications network components or customer's normal network connection 210 are not functioning. The customer's normal network connection and alternative connection 206, may be implemented over a number of technologies comprising twisted pair (Ethernet IEEE 802.3), coaxial cable, G.hn (Powerline), optical fibre, terrestrial microwave, satellite, cellular telephony, radio and spread spectrum. The customer's normal network connection and alternative connection 206, may be implemented using higher-layer technologies comprising: DSL, frame relay, ATM, T1/E1, SONET, Ethernet, cellular telephony and WiFi.

The device is provided with the identity (e.g. an IP address) of each customer communications network component it is connected to for monitoring purposes either by means of pre-installation configuration or of post-installation configuration obtained when it calls the middleware software service. When in "bi-directional" operating mode, the device will connect to the middleware software service to report its status and that it is now online and available. At this stage, if configuration is required, configuration details will be downloaded to the device and applied. This will happen after the identity of the middleware service has been confirmed (e.g. using cryptographic methods and over an encrypted link). For example, using SSL as an encrypted channel or using an SSL or IPSEC VPN.

Figure 4:
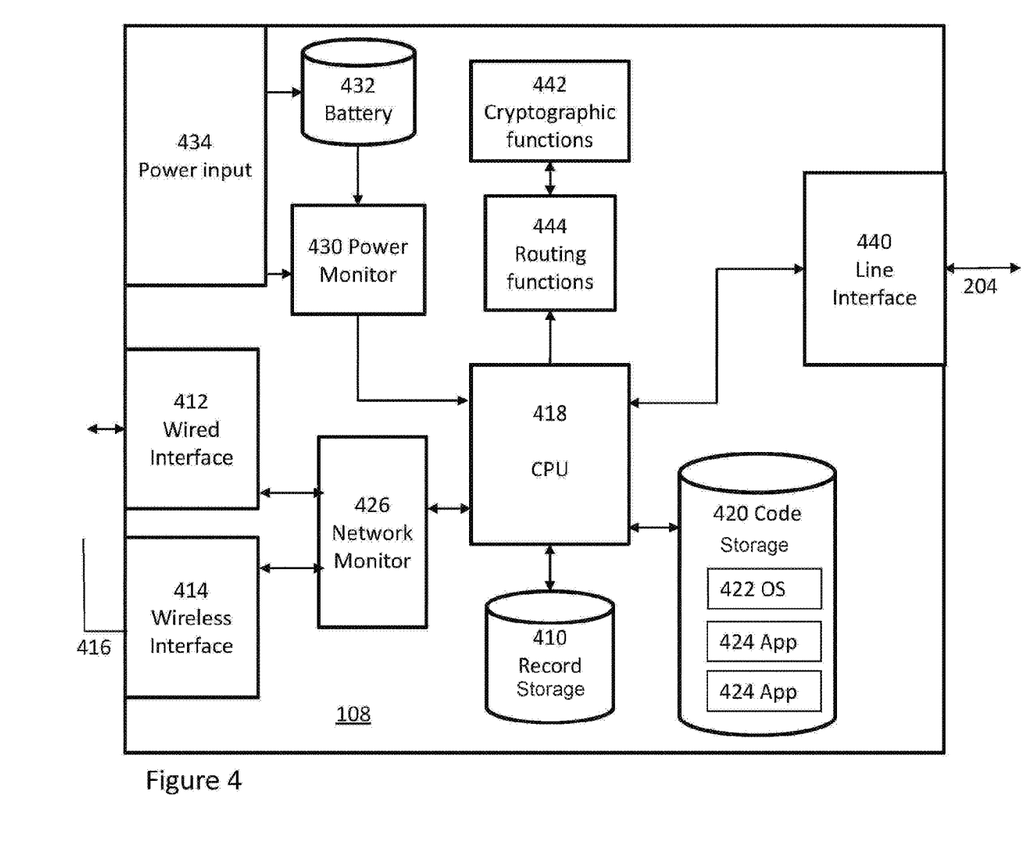
FIG. 4 shows a block diagram of a diagnostic device according to an embodiment of the present invention.

As shown in FIG. 4, diagnostic device 108 includes a memory: record store 410 for storing data including records of detected faults. Diagnostic device 108 also includes a memory: code store 420 for the storage of data and/or instructions such as software instructions for the diagnostic device. Memories 410, 420 may form parts of a single memory. Each memory or the single memory may be a volatile or non-volatile memory, for example a random access memory, a flash memory etc. The diagnostic device 108 may include a wired interface 412 for communications over link 110 with customer communications network components 102, 112 using, for example, an Ethernet (IEEE 802.3) coaxial cable, G.hn (Powerline), optical fibre or other physical connection, integrated solutions for which are commercially widely available. The diagnostic device 108 may further include a wireless interface 414 such as an embedded Wi-Fi 802.11b/g/n network interface module or network controller, integrated solutions for which are commercially widely available. The wireless network interface is operable with one or more antennae 416 for the transmission and receipt of wireless network communications over link 110 with customer communications network components 102, 112 using, for example, radio frequency signals.

Diagnostic device 108 includes network monitoring interface 426 (which may be hardware circuitry interfacing with processor 418 or firmware or software stored in code store 420 and executed by processor 418) for managing communications via wired interface 412 and wireless interface 414 to allow device 418 to monitor the customer's normal network connection 210 and operation of customer network 100. Diagnostic device 108 includes line interface 440 for communicating via alternative connection 204, 206, to the Internet 20 and devices connected thereto. Line interface 440 may comprise e.g. a Wi-Fi network interface or a mobile telephone network interface, for GPRS or one of the alternative mobile technologies listed, below, and capable of handling SMS. Standard cryptographic 442 and routing 444 functions are provided.

The diagnostic device 108 includes at least one processor 418 such as a microprocessor or a suite of cooperating processors communicatively connected to the memories 410, 420; to wired interface 412, wireless interface 414, line interface 440; and to network and power monitors 426, 430 via one or more buses or the like (not shown). The processor 418 is operable to execute computer software code such as machine code, assembly language code or code in an intermediate, compiled or bytecode form, such as computer software code stored in the memory 420. In particular, the processor is arranged to execute an operating system 422 for the diagnostic device, stored in memory 420, as a software component for supporting functions of the diagnostic device 108. Examples of operating systems for diagnostic devices include Linux operating system, Mac OS operating system for mobile computers; Microsoft Windows operating system; Microsoft Windows Phone operating system, Android operating system or iOS for smartphones; and Microsoft Windows RT, Android operating system or iOS for portable computing devices such as tablet computers.

In accordance with embodiments of the present invention, the operating system 422 is arranged to execute one or more of a plurality of diagnostic device applications 424. The applications 424 are stored in the memory 420 of the diagnostic device 108, such as by way of software instructions, libraries, executable files, instantiable software objects and the like. In accordance with embodiments of the present invention, the operating system 422 further executes or interfaces with diagnostic device components such as a hardware, software, firmware or combination thereof to ensure correct operation thereof.

As part of a configuration process, the device is notified of its own IP address and the IP addresses of equipment to be monitored (which may comprise interstitial switches such as 112 in FIGS. 2 and 3). The device then maps its route to the Internet 20, recording the number of hops, and monitors the availability of equipment and connections along the route between it and the Internet. This enables the device to identify the location of any break in the link, when it occurs.

A single device may monitor both the customer communications link 210 and one or more customer communications network component (e.g. a router and a switch) using standard ports and access methods on the customer communications network, and via standard channels, for example Wi-Fi and Ethernet. The device is capable of recognising and reporting that a fault has occurred. Fault reports may be sent to the middleware software service, for example to a Rest API. Reports may also be sent to a customer's own API or, possibly, directly to a customer's email account or mobile phone. Fault reports may be sent using, for example:

HTTPS (SSL) via TCP/IP on a wired, wireless or mobile link. The message will be in JSON and will include a UUID and a HMAC (shared secret) as a message authentication and identity mechanism. This is approach provides security and identity information without the overhead or infrastructure required of a full blown VPN; or SMS to a receiver, either run by the middleware software service, standalone or third party (e.g. http://www.twilio.com/sms, http://www.webtext.com/). The receiver then converts the SMS text into a request via TCP/IP to the middleware software service API as above.

The diagnostic device records a fault in the customer communications network when it fails to obtain a response from a customer communications network component to a stimulus message sent by the diagnostic device. To cover the possibility that a link between the device and the customer communications network may be the cause of the fault, the middleware software service may cross-correlate fault reports received from the device by reverse-testing, i.e. Initiating a test from the communications service provider network. The device detects a fault in a customer communications link if it fails to make a connection over the link to a selected destination on the wider Internet. Where the device queries the customer communications network (or other monitored device) via TCP/IP, RS232 or USB, then further information regarding both faults and other performance informational can be acquired. This will normally require privileged access.

According to an embodiment of the invention, the device also collects information on status and configuration of the customer communications network, other than fault reports. The device sends the status and configuration information to the customer or the communications service provider. This information on status and configuration of the customer communications network may be sent using similar mechanisms to those used to send fault reports. The status and configuration information may be used to aid fault analysis, e.g. it could aid analysis by reducing the unknowns (for example, by revealing: power status (on/off), customer communications network status (up/down), link status (up/down), path to the Internet (e.g. how many hops where the monitored customer communications network has further devices between it and the Internet).

Fault and status reporting messages from the device may traverse one or more firewalls. The customer may or may not have firewalls in place in order to protect their networks. In order to exit a firewall, the diagnostic device may attempt to report to the middleware software service API using commonly open Firewall egress ports (e.g. TCP/80, TCP/443. TCP/8200, TCP/8080, TCP/22, TCP/21). If connection is not successful, the diagnostic device may then try all 'well known' TCP ports. When a connection is successfully established, the port number used will be stored for future communication. If the port is blocked after discovery, the stored port number will discarded and the process of exit discovery restarted.

Reports from the device are received and processed at the communications service provider network, for example, by a middleware software service located in the service provider network. Advantageously, the middleware software service may cross-correlate results obtained from reverse testing with fault reports received from the device to better identify the nature and the cause of a fault. The middleware software service may initiate reverse testing—that is testing from the communications service provider network—of the network connection and customer communications network. For example, if failure of a switch in the customer communications network is detected by the device, the device will report it to the middleware software service. The middleware software service can then respond to the fault report received from the device by initiating a test from the communications service provider network to independently detect faults in the customer communications network and the customer communications link. If, for example, the test finds that the router in the customer communications network is reachable, this will tend to confirm that the switch, rather than the router or the link, has failed. This process can be used to minimise false positives.

The middleware software service may provide suitable management reports to maintenance staff or fault management systems. The management reports may assist in deciding whether a maintenance visit is required and, if so, whether the fault lies with the customer communications network or the customer communications link. Additionally, the diagnostic device can be configured to report directly to a customer or other endpoint via email or SMS, for example, as a fall-back in cases where communication with the middleware software service is temporarily not available.

Additionally, the device may have power-supply monitoring capability 430 and may be provided with battery 432 or other form of power backup so it may continue to function when the power supply at the customer location fails. Power-supply monitoring capability 430 monitors power input 434 and battery 432 and notifies processor 418 if either indicate insufficient supply (e.g. insufficient voltage). If a router or switch experiences a power failure, the device may detect the power failure and may generate a fault report indicating loss of function on the part of the router or switch and indicating power loss as the cause.

The basic operational mode is uni-directional, wherein the device receives no instructions from the middleware software service or the service provider network. In uni-directional mode, the device can send reports to the middleware software service at programmed intervals, e.g. every 10 seconds. An alternative operating mode is bi-directional, wherein the device may receive instructions from the middleware software service, for example, to instigate diagnostic and reporting activity. When operating in a bi-directional mode, the diagnostic device could implement a two-stage process whereby the middleware software service instructs the diagnostic device to bring up a full VPN tunnel.

Figure 5:
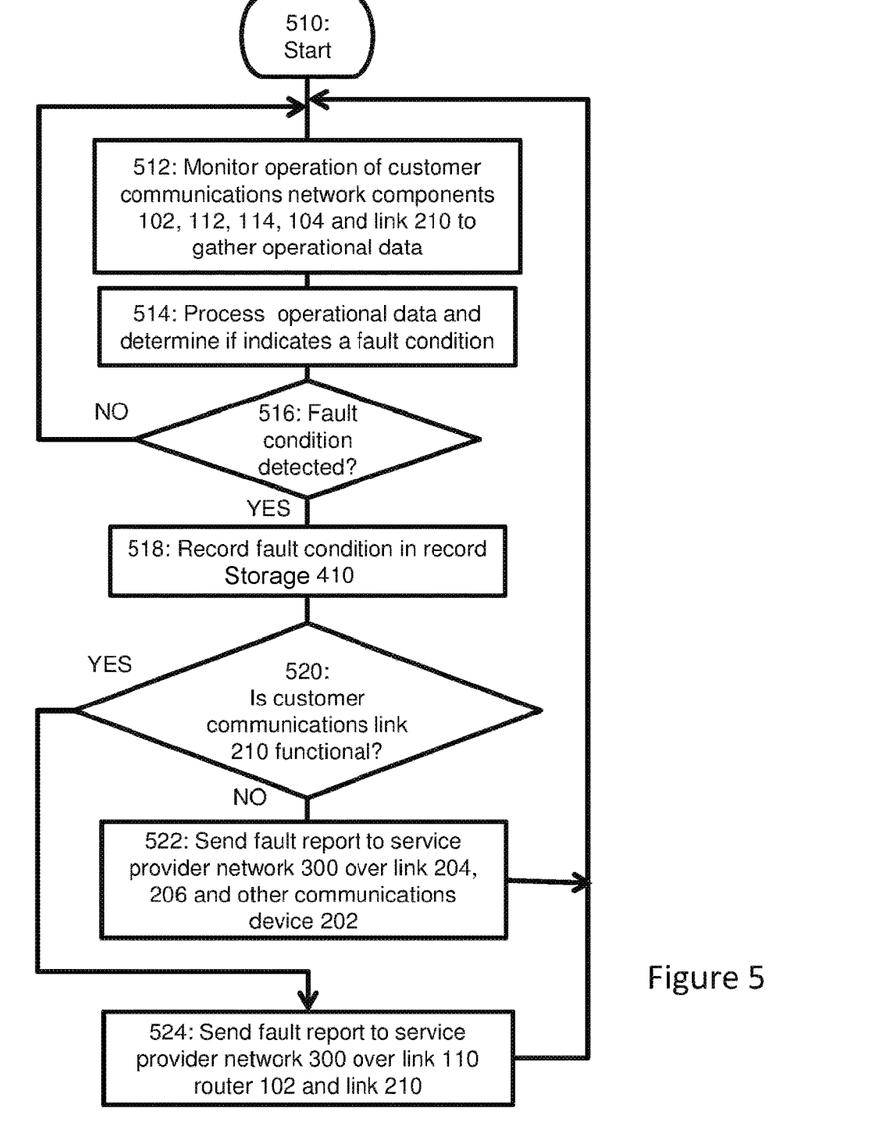
FIG. 5 shows a sequence of actions according to an embodiment of the present invention.

Operation of device 418 according to an embodiment of the invention will now be described with reverence to FIG. 5. The operation of device 418 results from execution by processor 418 of program code stored in code store 420. Operation of device 108 begins at start state 510 from power-on or reset with optional configuration and passes to state 512 in which device 418 monitors operation of one or more of link 210 and customer communications network components such as router 102, switch 112 and (via router 102 or switch 112) LAN 104 to gather operational data. The gathered operational data is processed by processor 418 at state 514 to determine if the data indicates a fault condition. If no fault condition is detected at decision 516, operation returns to the start 510. If a fault condition is detected at decision 516, a record of the detected fault condition is created in record store 410 by processor 418 at state 518. If access link 210 between router 102 and Internet 20 is found not to be functional at decision 520, a fault report is sent at state 522 to service provider network 300 via alternative link 204, 206 and other communications device 202. If customer communications link 210 between router 102 and Internet 20 is found to be functional at decision 520, a fault report is sent at state 524 to service provider network 300 over link 110 router 102 and link 210.

The invention has application to specialised network-connected equipment not located at a conventional customer premises, such as bus-stop electronic information displays and network-connected equipment located in remote or unmanned locations. Currently, there is no mechanism for automatically reporting the status of these kinds of remote equipment which rely upon a single link for communication, so a central control function may not know when a fault has occurred. The invention also has application to areas of the communications service provider's access network, for example street-based distribution cabinets or primary connection points.

The invention also has application to other "locations" provided with a communications link (either wired or wireless) to a network including: remote, small-office sites, ATMs, petrol pumps, unmanned weather stations or other measurement equipment, traffic lights Civil Defence sirens, electrical power transmission and distribution equipment, waste water collection and treatment systems, oil and gas pipelines, wind farms, radio masts (including mobile telephony) and other SCADA (supervisory control and data acquisition) systems.

The device may be based on a programmed, low-cost, single-board computer such as the Raspberry Pi or Arduino or a custom-made equivalent. Many existing processing platforms would also be suitable, when provided with appropriate software and interfaces, for implementing the device. Such existing processing platforms include, for example, a personal computer, a laptop computer, a tablet computer, a mobile telephone, a smartphone such as an Android, Windows or iOS smartphone, a portable terminal device or any other suitable mobile device with appropriate connection capability.

The egress point of any IP service from the customer communications network to the Internet may be some form of router, modem/router or NTE, Short Haul Data Services (SHDS)—i.e. Ethernet point to point—or LAN addressable from the diagnostic device. According to an embodiment, the diagnostic device will monitor a single egress point, the customer communications network and the customer's normal network connection. The diagnostic device may also report on the operation of the alternative connection for fallback reporting, e.g. "I have no mobile signal", "I have a strong mobile signal".

The alternative link by which the diagnostic device is able to communicate with the communications service provider network may, for example use Wi-Fi or SMS technology. When using WiFi technology, information is transmitted via an IEEE 802.11 connection to a Wireless Access Point which has its own independent connection to the Internet, separate from the link which is being monitored. The Wireless Access Point could, for example, be a BT HomeHub or other ADSL router with a built in Wireless Access Point or an open, public Wireless Access Point such as those provided by many city IT infrastructures and retail outlets. This wireless connection would be used to access the middleware software service API via TCP/IP or to communicate directly to the customer, e.g. via email.

When using GPRS technology, information is transmitted via a GPRS data connection in 2G/3G/4G, LTE/EDGE/UMTS/HSDPA/HSDPA+ or similar using a GPRS modem to a cellular telephony mast which has an independent connection to the Internet, separate from the customer communications link which is being monitored. The GPRS data connection would then be used to access the middleware software service API via TCP/IP or to communicate directly to the customer, e.g. via email.

When using SMS technology, information is transmitted via a GSM/CDMA/TDMA connection, using a GSM/CDMA/TDMA modem to a cellular telephony mast as a short text message to be received by a handling service which would either be co-located with the middleware software service or provided as a separate service (potentially by a third party). The text message would then be converted into a request via TCP/IP to the middleware software service API by the receiving service. The request may also be sent as a direct email to the customer using the service's internet connection separate from the link which is being monitored. Alternatively the SMS could be sent directly to the customer as an alert if operating in a stand-alone operational mode.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A diagnostic device for a communications network; wherein the communications network comprises a customer communications network located at a customer location and connected by a customer communications link to a communications service provider network remote from the customer location;
   wherein the diagnostic device comprises a network monitoring interface arranged to monitor operation of the customer communications network; a processor arranged to detect faults in the operation of the customer communications network, a storage for storing records of detected faults; wherein the processor is arranged to store records of detected faults in the storage and to generate a report on a detected fault based on the stored records;
wherein the diagnostic device is arranged to be co-located with the customer communications network and further comprises:
a first communications interface arranged to send to the communications service provider network via the customer communications link, the report generated on the detected fault; and
a second communications interface arranged to send automatically to the communications service provider network via a second communications link other than the customer communications link, the report generated on the detected fault.

2. The diagnostic device of claim 1, further comprising a link monitoring interface arranged to monitor operation of the customer communications link; and wherein the processor is arranged to detect faults in the customer communications link.

3. The diagnostic device of claim 1, wherein the processor of the diagnostic device is arranged to detect faults in a router comprised in the customer communications network.

4. The diagnostic device of claim 1, wherein the processor of the diagnostic device is arranged to detect faults in a modem comprised in the customer communications network.

5. The diagnostic device of claim 1, wherein each of the first and second communications interfaces are arranged to send to a service management server in the communications service provider network, fault report information based on the records stored in the storage.

6. The diagnostic device of claim 1, wherein the diagnostic device is arranged to be collocated with the customer communications network at a customer premises.

7. The diagnostic device of claim 1, wherein the second communications interface comprises a Wi-Fi interface.

8. The diagnostic device of claim 1, wherein the second communications interface comprises a cellular communications interface.

9. The diagnostic device of claim 1, wherein the fault report information identifies a location within the customer communications network associated with a detected fault.

10. The diagnostic device of claim 1, wherein the fault report information identifies whether a detected fault lies in the customer communications link or in the customer communications network.

11. The diagnostic device of claim 1, wherein the fault report information comprises information relating to a cause of a detected fault.

12. A diagnostic device for a communications network;
wherein the communications network comprises a customer communications network located at a customer location and connected by a customer communications link to a communications service provider network remote from the customer location;
wherein the diagnostic device comprises a network monitoring interface arranged to monitor operation of the customer communications network; a processor arranged to detect faults in the operation of the customer communications network, a storage for storing records of detected faults; wherein the processor is arranged to store records of detected faults in the storage and to generate a report on a detected fault based on the stored records;
wherein the diagnostic device is arranged to be co-located with the customer communications network and further comprises:
a first communications interface arranged to send to the communications service provider network via the customer communications link, the report generated on the detected fault; and
a second communications interface arranged to send to the communications service provider network via a second communications link other than the customer communications link, the report generated on the detected fault;
wherein the first communications interface and/or the second communications interface is arranged to send to the communications service provider network a prompt to initiate testing from the communications service provider network of the customer communications network and/or the customer communications link.

13. A method for diagnosing a fault in a communications network;
in which the communications network comprises a customer communications network located at a customer location and connected by a customer communications link to a communications service provider network remote from the customer location;
in which the method comprises, at a diagnostic device co-located with the customer communications network and comprising a first communications interface arranged to send to the communications service provider network via the customer communications link, information on detected faults, and a second communications interface arranged to send automatically to the communications service provider network via a second communications link other than the customer communications link, information on detected faults:
monitoring the customer communications network;
detecting faults in the operation of the customer communications network;
generating fault reports comprising information on the detected faults in the operation of the customer communications network; and
sending the fault reports to the communications service provider network via one of: (i) the customer communications link using the first communications interface of the diagnostic device and (ii) the second communications link other than the customer communications link automatically using the second communications interface of the diagnostic device.

14. A computer program product comprising computer program code to, when loaded into a computer system and executed thereon, cause the computer system to perform the steps of a method for diagnosing a fault in a communications network;
in which the communications network comprises a customer communications network located at a customer location and connected by a customer communications link to a communications service provider network remote from the customer location;
in which the method comprises, at a diagnostic device co-located with the customer communications network and comprising a first communications interface arranged to send to the communications service provider network via the customer communications link, information on detected faults, and a second communications interface arranged to send automatically to the communications service provider network via a second communications link other than the customer communications link, information on detected faults:

monitoring the customer communications network;

detecting faults in the operation of the customer communications network;

generating fault reports comprising information on the detected faults in the operation of the customer communications network; and sending the fault reports to the communications service provider network via one of: (i) the customer communications link using the first communications interface of the diagnostic device and (ii) a second communications link other than the customer communications link using automatically the second communications interface of the diagnostic device.

15. A method for diagnosing a fault in a communications network:

in which the communications network comprises a customer communications network located at a customer location and connected by a customer communications link to a communications service provider network remote from the customer location;

in which the method comprises, at a diagnostic device co-located with the customer communications network and comprising a first communications interface arranged to send to the communications service provider network via the customer communications link, information on detected faults, and a second communications interface arranged to send to the communications service provider network via a second communications link other than the customer communications link, information on detected faults;

monitoring the customer communications network;

detecting faults in the operation of the customer communications network;

generating fault reports comprising information on the detected faults in the operation of the customer communications network; and sending the fault reports to the communications service provider network via one of: (i) the customer communications link using the first communications interface of the diagnostic device and (ii) the second communications link other than the customer communications link using the second communications interface of the diagnostic device;

wherein the first communications interface and/or the second communications is arranged to send to the communications service provider network a prompt to initiate testing from the communications service provider network of the customer communications network and/or the customer communications link.

16. A computer program product comprising computer program code to, when loaded into a computer system and executed thereon, cause the computer system to perform the steps of a method for diagnosing a fault in a communications network;

in which the communications network comprises a customer communications network located at a customer location and connected by a customer communications link to a communications service provider network remote from the customer location;

in which the method comprises, at a diagnostic device co-located with the customer communications network and comprising a first communications interface arranged to send to the communications service provider network via the customer communications link, information on detected faults, and a second communications interface arranged to send to the communications service provider network via a second communications link other than the customer communications link, information on detected faults;

monitoring the customer communications network;

detecting faults in the operation of the customer communications network;

generating fault reports comprising information on the detected faults in the operation of the customer communications network; and sending the fault reports to the communications service provider network via one of: (i) the customer communications link using the first communications interface of the diagnostic device and (ii) a second communications link other than the customer communications link using the second communications interface of the diagnostic device;

wherein the first communications interface and/or the second communications is arranged to send to the communications service provider network a prompt to initiate testing from the communications service provider network of the customer communications network and/or the customer communications link.

\* \* \* \* \*